May 16, 1961  B. H. OXBORROW  2,984,060
CARTON-CLOSING MACHINES
Filed July 1, 1960  11 Sheets-Sheet 2

Inventor
BERNARD H. OXBORROW
By
Attorneys

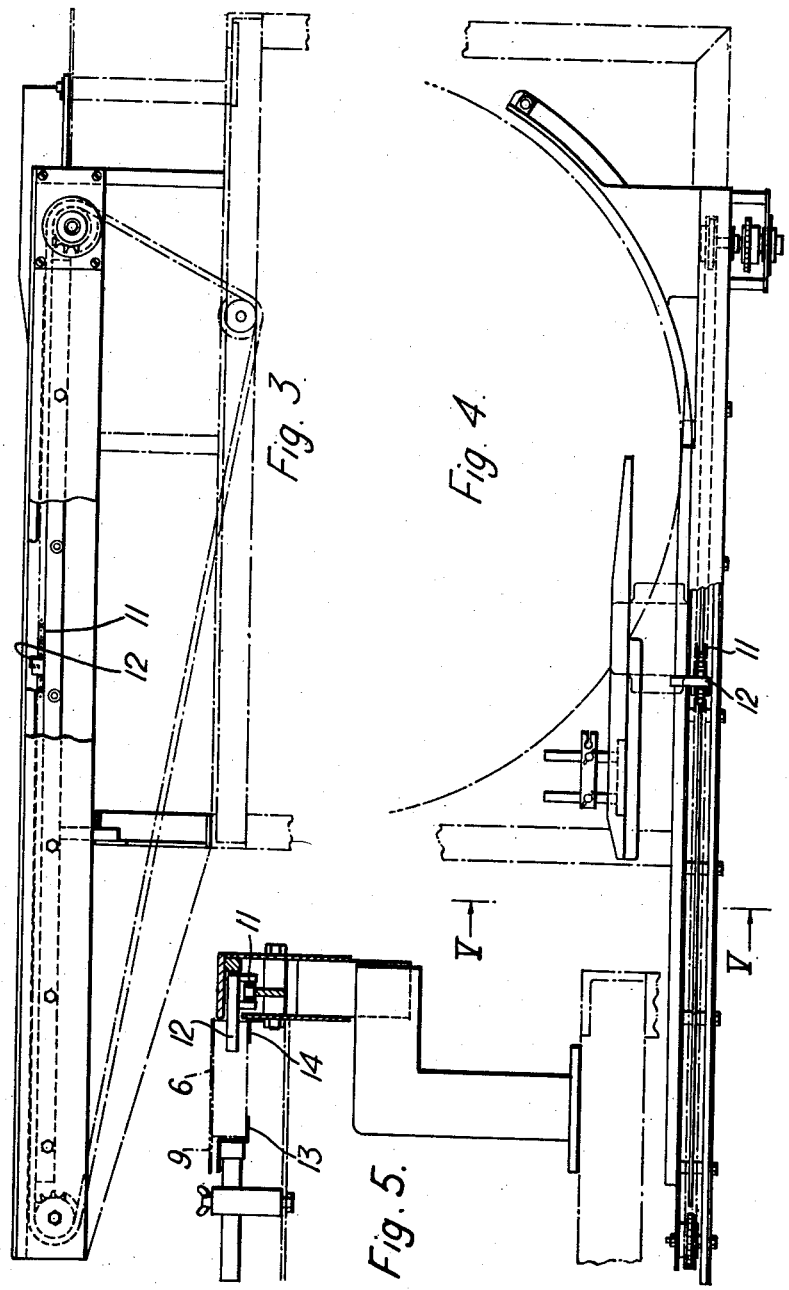

May 16, 1961 B. H. OXBORROW 2,984,060
CARTON-CLOSING MACHINES
Filed July 1, 1960 11 Sheets-Sheet 4
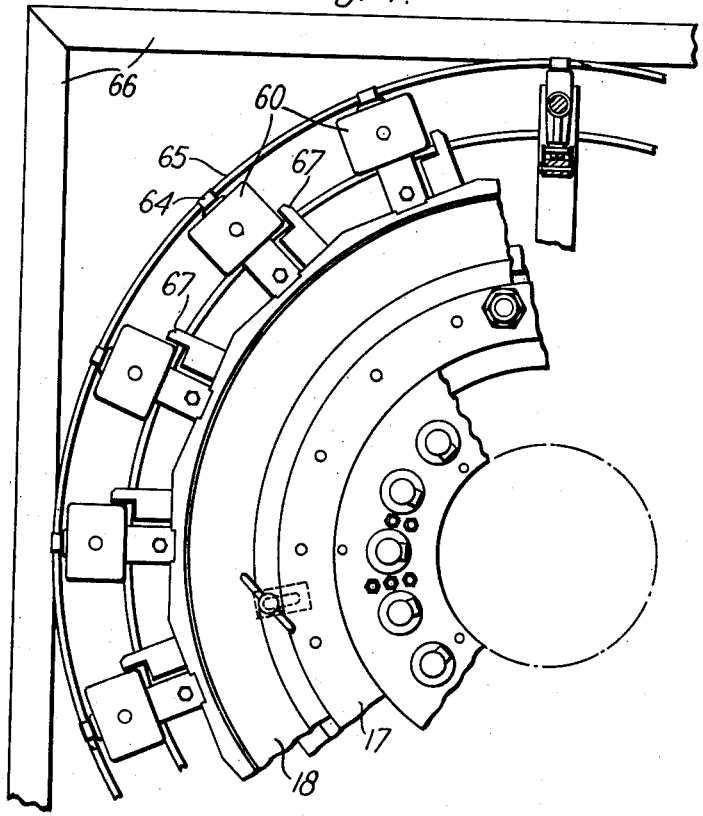
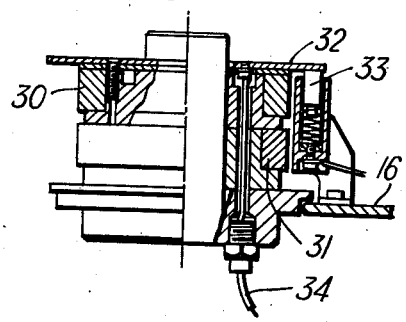
Inventor
BERNARD H. OXBORROW
By
Attorneys

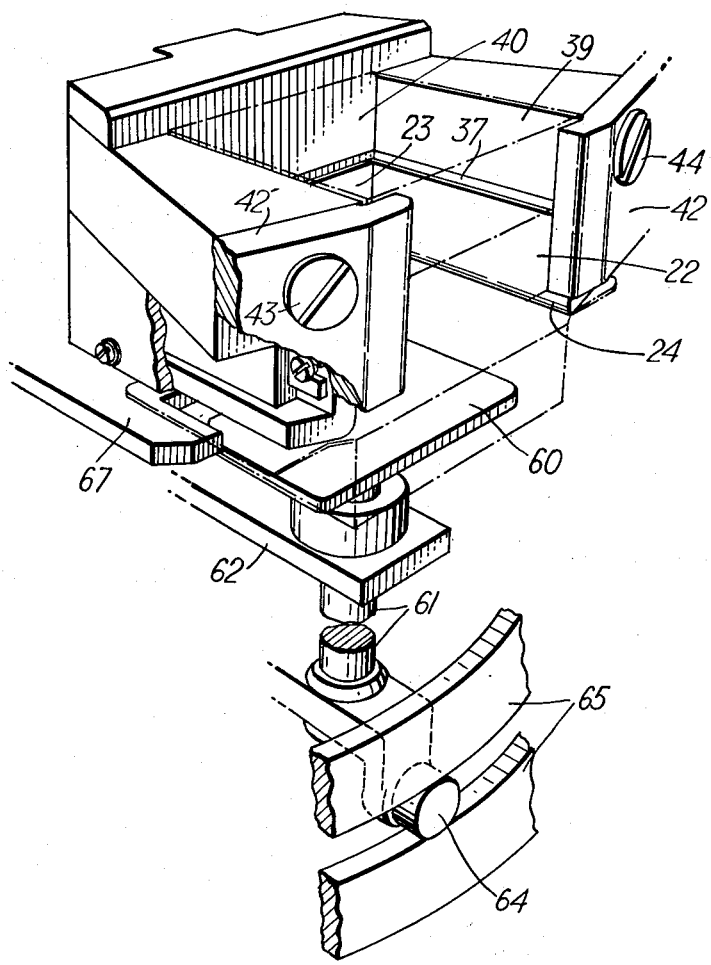

May 16, 1961     B. H. OXBORROW     2,984,060
CARTON-CLOSING MACHINES
Filed July 1, 1960     11 Sheets-Sheet 6
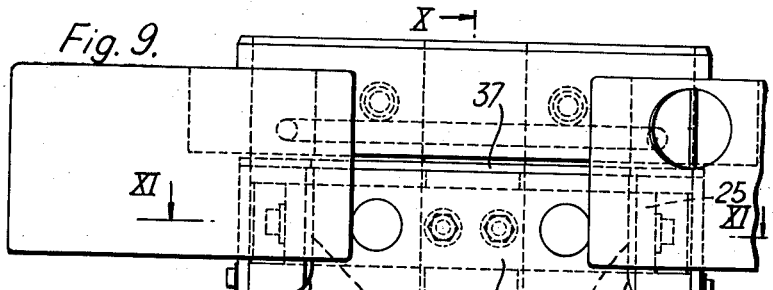
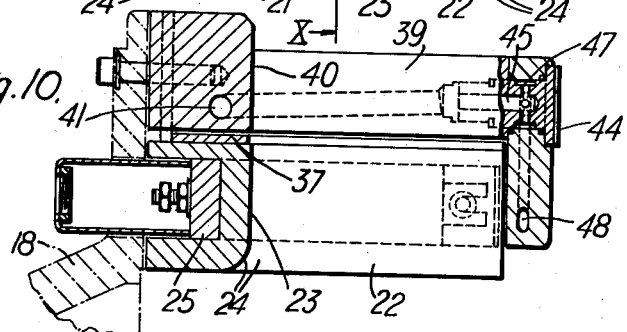
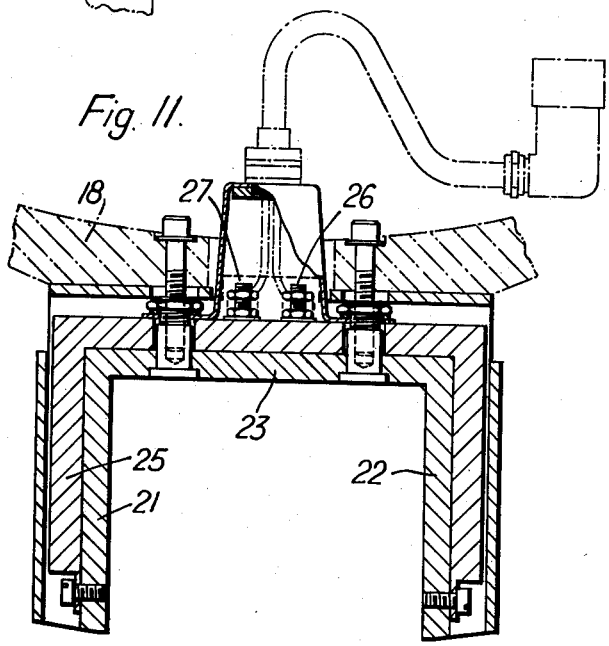
Inventor
BERNARD H. OXBORROW May 16, 1961  B. H. OXBORROW  2,984,060
CARTON-CLOSING MACHINES
Filed July 1, 1960  11 Sheets-Sheet 8

Inventor
BERNARD H. OXBORROW

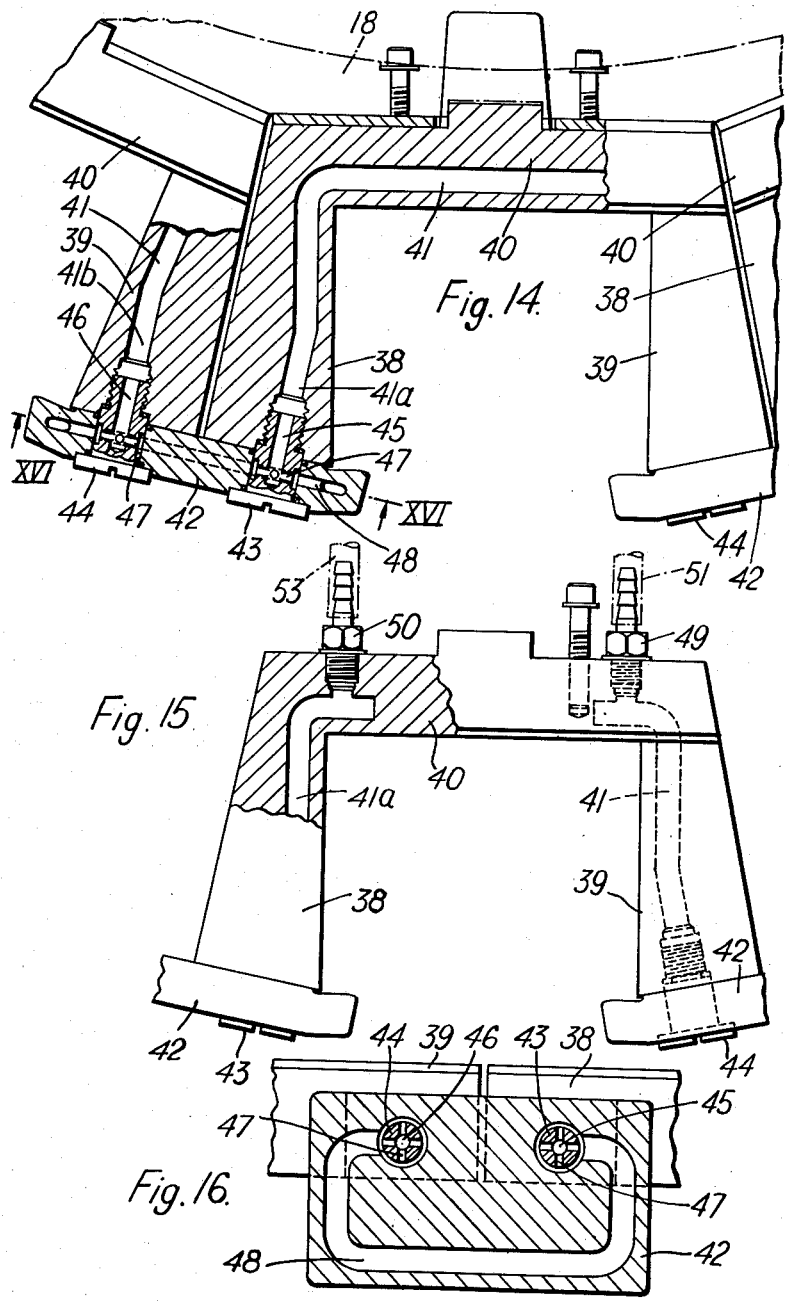

May 16, 1961     B. H. OXBORROW     2,984,060
CARTON-CLOSING MACHINES

Filed July 1, 1960     11 Sheets-Sheet 10

*Inventor*
BERNARD H. OXBORROW
By
*Attorneys*

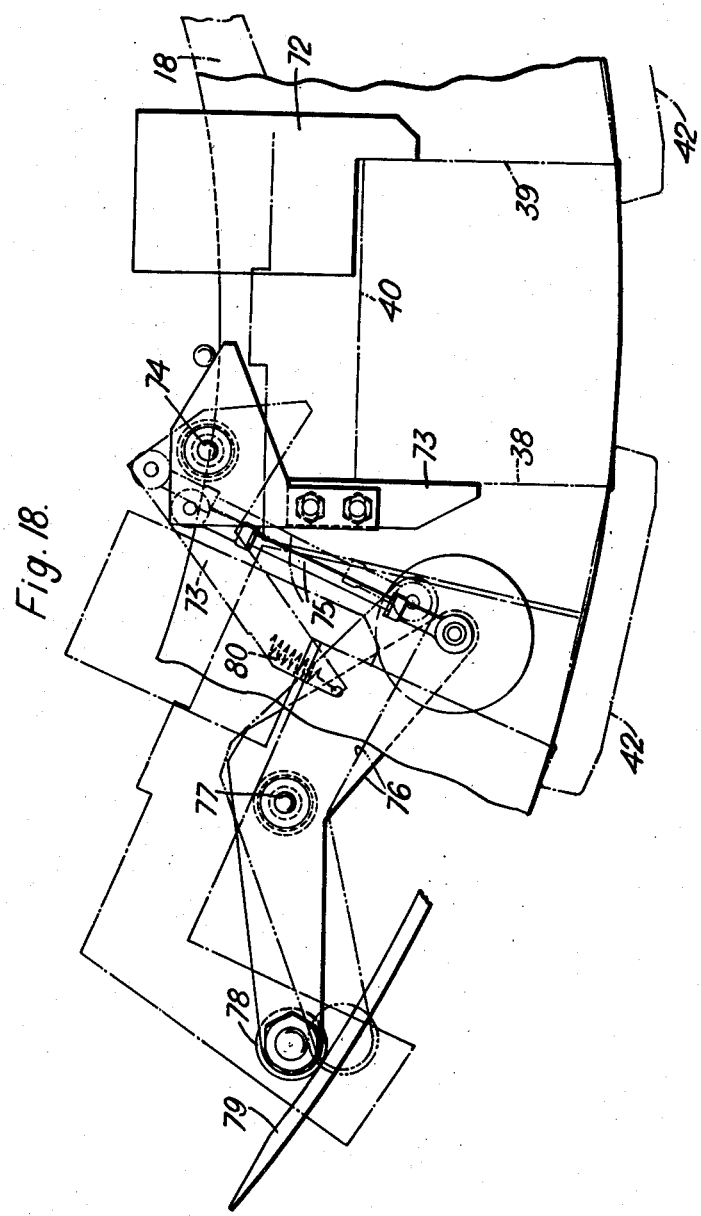

United States Patent Office 2,984,060
Patented May 16, 1961

2,984,060
CARTON-CLOSING MACHINES
Bernard Hewlett Oxborrow, Swindon, England, assignor to The Metal Box Company Limited, London, England, a British company Filed July 1, 1960, Ser. No. 40,404
Claims priority, application Great Britain Aug. 7, 1959
19 Claims. (Cl. 53—388)

This invention relates to carton-closing machines and in particular to a machine for closing a carton having a lid hinged to the back of the carton body and side and front lid flaps to be engaged with the sides and front of the body and secured thereto by heat-sealable material.

It is a main object of the present invention to provide a machine for closing cartons of the kind mentioned above, the machine being so constructed as to ensure that the carton remains in the machine for an interval of time which ensures adherence of the parts of the carton which are to be secured in the machine while providing a machine of relatively small compass and which is capable of effecting closing of cartons at a relatively high rate.

According to the invention there is provided for closing a carton having a lid hinged to the back of the carton body and side and front lid flaps to be engaged with the sides and front of the body and secured thereto by a heat-sealable material, said machine comprising a plurality of equi-spaced heating chambers each of which is aligned and movable with a cooling chamber appropriate thereto, a rotatable carrier with which the chambers are movable, and means operable during each revolution of the carrier to move a carton into a heating chamber and to effect engagement of the side and front lid flaps of the carton with the sides and front of the body thereof, to move a carton from the heating chamber into the cooling chamber appropriate thereto, and to eject a carton from the cooling chamber.

Figure 1:
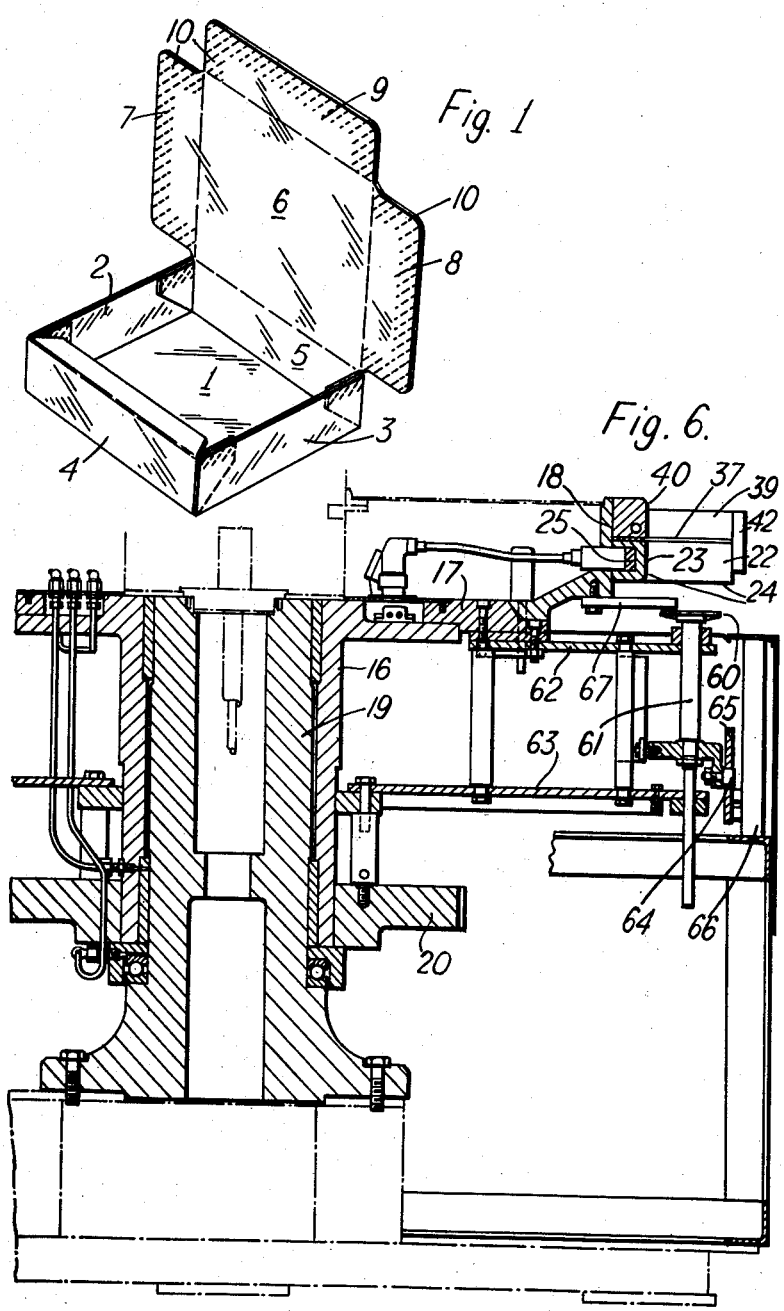
Figure 2:
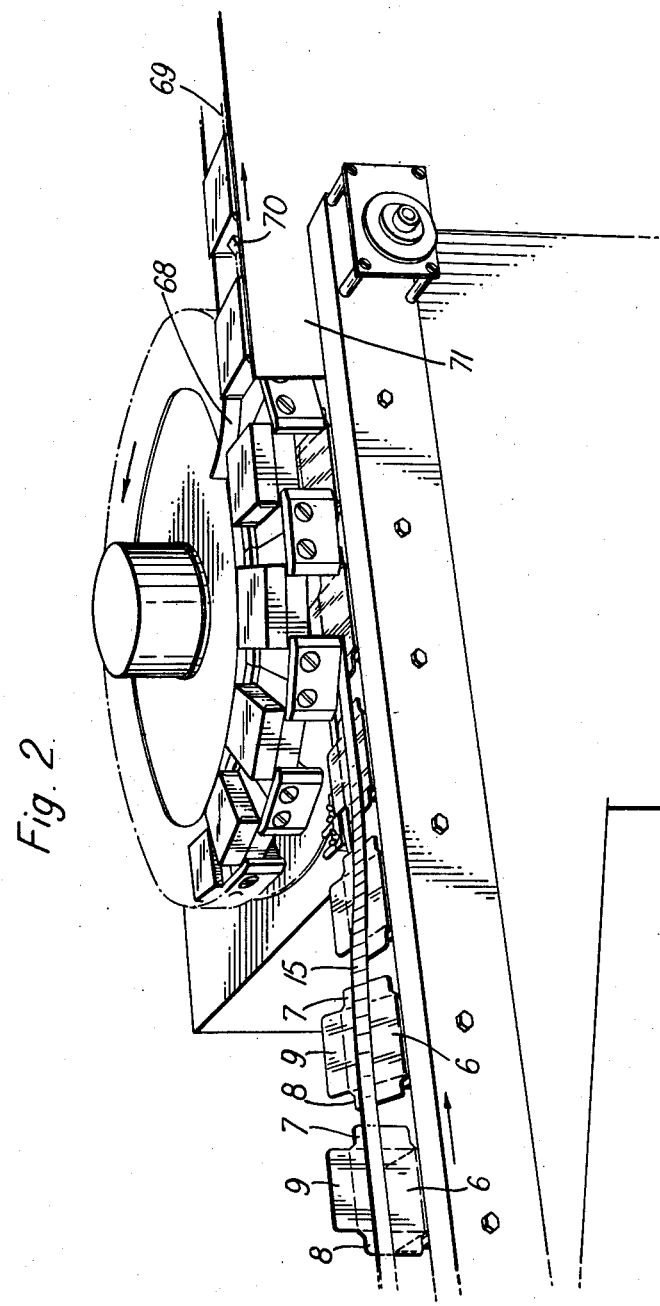
Figure 12:
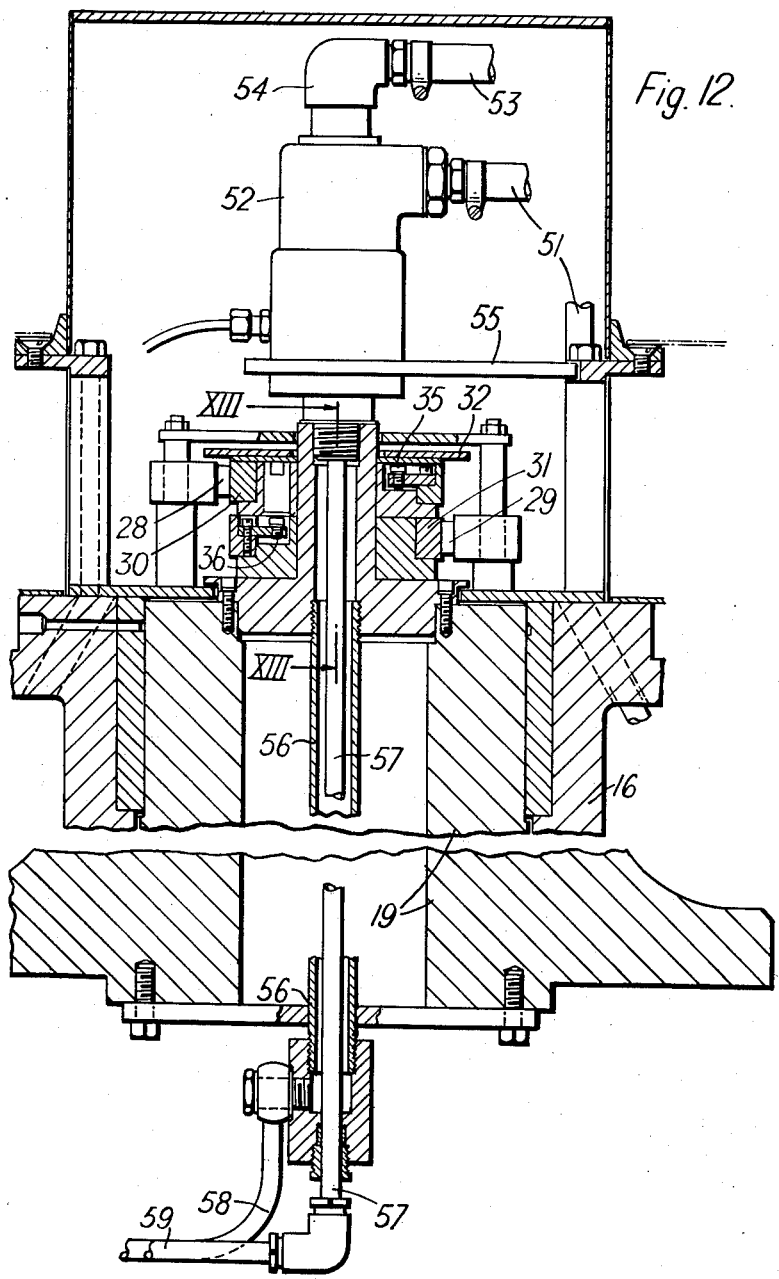
Figure 12A:
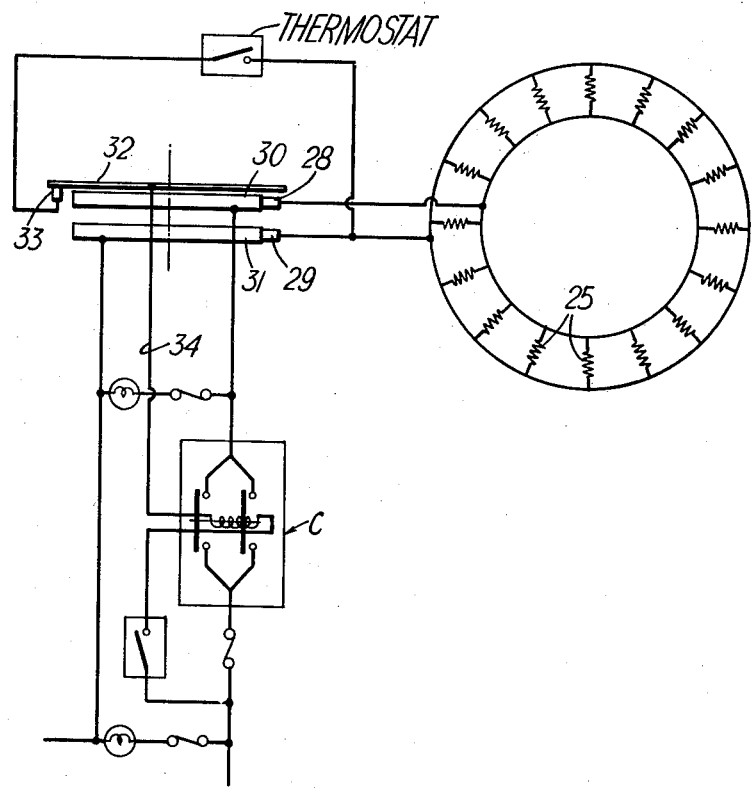
Figure 17:
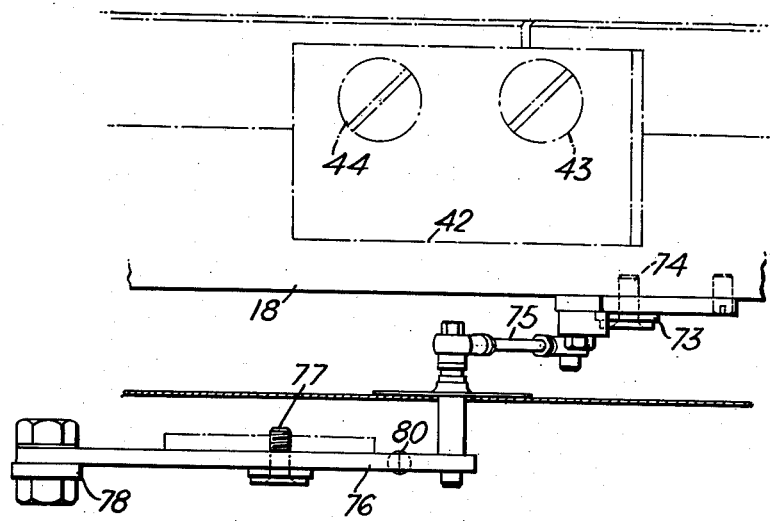

In order that the invention may be clearly understood, one embodiment thereof will now be described, by way of example, with reference to the accompanying drawings, in which:

Fig. 1 illustrates a carton to be closed by the machine according to the invention, Fig. 2 is a pictorial view of the machine according to the invention, Fig. 3 is a side elevation of a delivery conveyor by which cartons are delivered to the closing apparatus, Fig. 4 is a top plan, partly in section, of Fig. 3, Fig. 5 is a section on line V—V, Fig. 4, Fig. 6 is a section through a part of the carton closing apparatus, some parts of the mechanism being omitted for clarity, Fig. 7 is a top plan of a part of the closing apparatus, Fig. 8 is a perspective view illustrating a heating and cooling chamber and means for moving cartons into and out of the chambers, Fig. 9 is an end elevation of a heating and cooling chamber, Fig. 10 is a section on line X—X, Fig. 9, Fig. 11 is a section on line XI—XI, Fig. 9, Fig. 12 is a section through a part of the closing apparatus and illustrates the means by which the heating and cooling chambers are respectively heated and cooled, Fig. 12A is a heater circuit diagram, Fig. 13 is a section on line XIII—XIII, Fig. 12, Fig. 14 is a part section through two adjacent cooling chambers, Fig. 15 illustrates the cooling chamber to which cooling fluid is delivered and from which the cooling fluid leaves the machine, Fig. 16 is a section on line XVI—XVI, Fig. 14, Fig. 17 illustrates in elevation a modification to the apparatus shown in Figs. 6 and 8, some parts being omitted for clarity, and Fig. 18 is a plan of Fig. 17.

Referring to Fig. 1, the carton therein disclosed is made from cardboard blank the opposite sides of which are gloss-waxed by the application to the whole area of the blank of a coating of a low viscosity paraffin wax. The carton comprises a body portion having a rectangular four-sided bottom 1, side walls, 2, 3, a front wall 4, and a rear wall 5. To the rear wall 5 there is hinged a lid 6 having side lid flaps 7, 8 and a front lid flap 9. The inner surfaces of the flaps 7, 8 and 9 are coated with a thermoplastic adhesive composition indicated by the reference 10, this composition being applied to the flaps beneath the paraffin wax mentioned above. The thermoplastic adhesive composition is a composition which is incompatible with the wax, is non-tacky at normal temperatures and is softened at a temperature higher than the melting temperature of the wax. The softening temperature of the adhesive composition is preferably appreciably above the melting temperature of the wax, the difference being for example of the order of 20° C. One suitable form of thermoplastic adhesive composition is a polyvinyl acetate resin having incorporated therein plasticisers which render it heat-sealable but non-tacky at normal temperatures when applied to a blank as illustrated in the drawings.

It is to be understood that, if desired, instead of the blank being wax-coated and provided with thermoplastic adhesive as described above, it may be coated with a heat-sealable material such as polythene.

Following the insertion of the contents of the carton into the bodies, the cartons are received by a delivery conveyor which moves the cartons one at a time in succession to the closing apparatus, the lids being caused to overlie the open tops of the carton bodies during movement of the cartons by the delivery conveyor. The delivery conveyor comprises an endless continuously movable chain 11, Figs. 3 and 4, and 5 which carry pusher pieces 12 arranged to engage the carton bodies and to move them over guides 13, 14, Fig. 5. As the cartons are moved by the pusher pieces towards the closing apparatus, the lids are down-turned to overlie the open tops of the bodies by a plough-folder 15, indicated diagrammatically in Fig. 2.

The pusher pieces 12 move the cartons in a path which is tangential to the path of a rotatable carrier on which there is mounted for rotation therewith a plurality of equi-spaced heating chambers each of which is aligned and movable with a cooling chamber disposed above and appropriate thereto. The rotatable carrier comprises a flanged sleeve 16, Fig. 6, to which is secured a mounting ring 17 supporting a turret 18. The sleeve 16 is rotatable about a stationary pillar 19 and rotation of the carrier is effected by a gear wheel 20, Fig. 6, continuously rotated in any suitable manner, not shown, for example by a pinion driven from an electric motor.

The heating and cooling chambers are secured to the turret 18 and each heating chamber consists of two opposed walls 21, 22, Figs. 9 to 11, and an end wall 23 contiguous therewith. The walls 21, 22 and 23 are provided with rounded edges 24 by which, when a carton delivered by the delivery conveyor is moved upwards into the heating chamber, the side and front lid flaps 7, 8, 9 are folded downwards to engage the sides and front 2, 3, 4 of the body. The front lid flap 9 is engaged by the wall 23 and the side lip flaps 7, 8 by the walls 21, 22 and the arrangement is such that these walls will exert a pressure against the lid flaps so that they are pressed firmly against the sides and front of the carton body. The walls 21, 22 and 23 embody an electric resistance heater 25, each heater being provided with terminals 26, 27 Fig. 11, by which the heater elements are connected through electrical brushes 28, 29, Figs. 12 and 12A, rotatable with the sleeve 16. The brushes 28 co-operate with a stationary brass slip ring 30 and the brushes 29 with a similar slip ring 31. Electrical potential is applied to the slip rings from a source, not shown, by a slip disc 32, Fig. 12, by a carbon brush 33, Figs. 12A and 13, and line 34 to a contactor C, Fig. 12A. The slip disc 32 is connected with ring 30 by a terminal 35, Fig. 12, and slip ring 31 is connected with the slip disc 32 by a terminal 36.

The cooling chamber appropriate to the heating chamber is disposed above and is aligned with the heating chamber, the heating and cooling chambers being separated one from the other by suitable heat-insulating material 37, Fig. 10. Each cooling chamber consists of two opposed walls 38, 39 and a wall 40 contiguous therewith, see Figs. 14 and 15, the carton-engaging faces of these walls being located in the same planes as the carton engaging faces of the walls 21, 22 and 23 of the heating chamber. The cooling chambers are arranged to be cooled by a cooling fluid, preferably water, which is passed through the walls 38, 39, 40. To this end each of the walls of the cooling chamber is provided with a conduit 41 and the conduits of the adjacent cooling chambers are connected in series. The series connection between the cooling chambers is effected by cover members 42 which are secured to the walls 38, 39 of adjacent cooling chambers by shoulder screws 43, 44 having axial bores 45, 46 which communicate respectively with the outflow end 41a of a conduit 41 of one cooling chamber and the inflow end 41b of the conduit 41 of the next adjacent cooling chamber. The axial bores 45, 46 each communicate with radial bores 47 which, in turn, communicate with a groove 48 formed in the cover 42 thus permitting water to flow in succession through the conduits 41 to the cooling chambers. One of the cooling chambers, as illustrated in Fig. 15, is provided with a conduit 41 of slightly modified form, the conduit having two branches one of which is connected with an inflow coupling 49 and the other with an outflow coupling 50. It will be understood that although the couplings 49, 50 have been referred to respectively as inflow and outflow they may, if desired, be outflow and inflow according to the direction in which the water is to flow between the adjacent cooling chamber. The inflow coupling 49 is connected by a flexible hose 51, Fig. 12, to a rotary union 52, of known construction, and the outflow coupling 50 is connected by a flexible hose 53 with an adaptor 54 which, in turn, is connected with the rotary union 52. The rotary union permits the hoses 51, 53 to move with the cooling chamber to which they are connected and the stationary portion of the rotary union is constrained against rotational movement by a stationary plate 55. The inflow hose 51 and outflow hose 53 are connected respectively with an inflow pipe 56 and an outflow pipe 57, these pipes being concentric one with the other and extending through the stationary pillar 19. The pipes 56 and 57 are connected respectively with an inflow pipe 58 and an outflow pipe 59. The inflow pipe 58 is connected with a source of mains water and it will be understood that during operation of the machine water will flow from pipe 58 through pipe 56, hose 51, inflow coupling 49 and thence through the series connected pipes 41 and out through outflow coupling 50, hose 53, pipe 57 and pipe 59.

Each of the heating and cooling chambers has associated therewith means which are operable during each revolution of the carrier to move the carton into a heating chamber and to effect engagement of the side, front and lid flaps of the carton with the sides and front of the body thereof, to move the carton from the heating chamber into the cooling chamber appropriate thereto and to eject the carton from the cooling chamber. These means are formed in part by the rounded edges 24 of the walls 21, 22 and 23 and the movement of the carton is effected by a pusher element 60, Figs. 6 and 8, which is supported for movement with the carrier and for axial movement relative thereto. The pusher element 60 is carried by a stem 61 slidable axially in bushings carried by plates 62, 63 secured respectively to the mounting ring 17 and to the gear wheel 20. Axial movement of the pusher element 60 is controlled by a cam follower 64 carried by the stem 61 and co-operating with a cam 65 which is concentric with the axis of rotation of the carrier and which is supported by a stationary machine frame 66, Fig. 6.

Each heating chamber is provided with a locating device in the form of a finger 67, and as finger 67 approaches the position at which a carton is delivered from the delivery conveyor 11 it engages behind the carton to continue the movement of the carton at the rate of angular movement of the carrier when the carton is disengaged by the pusher piece 12. If it is assumed that the machine is in full operation, each of the heating and cooling chambers will for a part of a revolution of the carrier contain a closed carton and accordingly when a new carton is engaged by a finger 67 there are two cartons arranged one above the other, one of said cartons being located on the pusher element 60. Shortly after the incoming carton is positioned on the pusher element 60, the pusher element 60 is caused to rise, as viewed in Fig. 6, under the action of cam 65 and this movement will cause the carton resting on the pusher element 60 to be moved into the heating chamber and to have the side and front lid flaps of the carton folded downwardly. A dwell on cam 65 causes the pusher element to remain in this position thereof for about 180° of movement of the carrier and the cam then causes a further rise of the pusher thereby to move the carton resting thereon upwards out of the heating chamber and into the cooling chamber. Simultaneously, the carton which is already in the cooling chamber is lifted to a position at which it is clear of the cooling chamber and at which it will be engaged by stripper plate 68, Fig. 2, by which it is caused to move into the path of a discharge conveyor comprising an endless chain conveyor 69 provided with pusher pieces 70 which move the closed cartons in succession to any suitable delivery position. The pusher element 60 is returned by cam 65 to the lowermost position thereof before it again reaches the position at which it is to receive a further carton from the delivery conveyor 11.

During movement of the closed cartons on to the discharge conveyor they are guided by a guide rail 71 and the discharge conveyor moves the discharged cartons in a path which is tangential to the path in which the cartons are moved by the rotatable carrier.

Figs. 17 and 18 illustrate a modification to the apparatus shown in Figs. 6 and 8 and which is provided to give a greater control of the carton prior to the lifting thereof into the heating chamber by the pusher element 60. As shown in Figs. 17 and 18, a stop 72 is secured to the turret 18 and is so positioned as to determine the location of the carton on the pusher element 60 in preparation for movement by the pusher element into the heating chamber. The locating device is formed by a finger 73 which is pivoted at 74 to the turret 18 and is connected to one end of a connecting rod 75 the opposite end of which is connected to one arm of a bell-crank lever 76 pivoted at 77 to the turret. Lever 76 carries a cam follower 78 arranged to co-operate with a stationary cam 79 and the lever 76 is normally urged by spring 80 to the position thereof shown in broken lines. Just prior to a pusher element 60 being moved to the position at which it is operated to raise a carton resting thereon into the heating chamber associated therewith the lever 76 co-operating therewith is rocked by cam 79, clockwise as viewed in Fig. 18, to move finger 73 to the full line position thereof and thus move the carton on the pusher element 60 against the stop 72 thereby to align the carton for raising thereof by the pusher element 60. The finger 73 is retained in engagement with the carton until the carton is raised into the heating chamber by the pusher element 60.

From the foregoing description it will be understood that each carton is moved on to the rotatable carrier during one revolution thereof and is removed from the carrier during the next succeeding revolution thereof. By this arrangement a carton remains in the heating chamber for an interval of time which ensures softening of the adhesive composition and adhesion of the lid flaps to the sides and front of the body, and in a cooling chamber for an interval of time which ensures cooling and setting of the adhesive composition. The closing apparatus occupies only a relatively small space and is capable of operation at relatively high speeds.

What I claim is:

1. A machine for closing a carton having a lid hinged to the back of the carton body and side and front lid flaps to be engaged with the sides and front of the body and secured thereto by a heat-sealing material, said machine comprising a rotatable carrier, a plurality of heating chambers movable with said carrier, a plurality of cooling chambers, one for each heating chamber, movable with the carrier, each cooling chamber being aligned with a heating chamber appropriate thereto to permit a carton to be moved from the heating chamber into the cooling chamber, and means operable during each revolution of the carrier to move a carton into a heating chamber and to effect engagement of the side and front lid flaps of the carton with the sides and front of the body of the carton, to move a carton already in the heating chamber into the cooling chamber aligned therewith, and to eject from the cooling chamber a carton already located therein.

2. A machine for closing a carton having a lid hinged to the back of the carton body and side and front lid flaps to be engaged with the sides and front of the body and secured thereto by a heat-sealing material, said machine comprising a rotatable carrier, a plurality of heating chambers movable with said carrier, a plurality of cooling chambers, one for each heating chamber, movable with the carrier, each cooling chamber being aligned with a heating chamber appropriate thereto to permit a carton to be moved from the heating chamber into the cooling chamber, a cam concentric with the axis of rotation of the carrier, and for each heating chamber a pusher element supported for movement with the carrier and operable by said cam to move a carton into the heating chamber thereby effecting engagement of the side and front lid flaps of the carton with the sides and front of the body of the carton, to move a carton already in the heating chamber into the cooling chamber aligned therewith, and to eject from the cooling chamber a carton already located therein.

3. A machine according to claim 2, including heater elements embodied in the walls of each of the heating chambers, and electrical brushes rotatable with the carrier and connecting the heater elements with a source of electrical potential.

4. A machine according to claim 2, in which the wall of each cooling chamber has a conduit formed therein to permit the passage therethrough of a cooling fluid, said conduits being connected in series.

5. A machine according to claim 2, in which the wall of each cooling chamber has a conduit formed therein, one of said conduits having an inflow coupling and an outflow coupling connected therewith and each of the other conduits having the input end thereof connected with the output end of the conduit of the next adjacent cooling chamber.

6. A machine according to claim 5, including a stationary pillar about which the carrier is rotatable, and concentric inflow and outflow pipes extending through said pillar and connected respectively with said inflow and outflow couplings.

7. A machine according to claim 2, including a delivery conveyor operable to move cartons one at a time along a path tangential to that of said carrier and to position the cartons on successive pusher elements for movement thereby into the heating chambers associated therewith.

8. A machine according to claim 7, including folder means co-operating with said delivery conveyor and operable to fold the lid of a carton to overlie the body thereof preparatory to the movement of the carton by a pusher element into a heating chamber.

9. A machine according to claim 7, including for each heating chamber a locating device movable therewith and operable to engage a carton delivered by said delivery conveyor and to locate the carton on the pusher element associated with the heating chamber in preparation for movement of the carton into the heating chamber by the pusher element.

10. A machine according to claim 9, wherein the locating means comprises a stop movable with the heating chamber, a locating finger movable with and relative to the heating chamber, and finger-actuating means operable to control movement of said locating finger towards and away from the stop and to urge a carton into engagement with the stop.

11. A machine according to claim 10, in which the locating finger is pivotally mounted on the rotatable carrier and the finger-actuating means comprises a bell-crank lever pivotally mounted on the carrier, a connecting rod connecting the locating finger and said lever, a spring urging the finger away from said stop, and a stationary cam arranged for co-operation with the lever to effect movement thereof about its pivotal axis to move the finger towards the stop.

12. A machine for closing a carton having a lid hinged to the back of the carton body and side and front lid flaps to be engaged with the sides and front of the body and secured thereto by a heat-sealing material, said machine comprising a carrier rotatable continuously about a vertical axis, a plurality of heating and cooling chambers movable with the carrier and arranged in pairs each consisting of a cooling chamber superimposed on a heating chamber and providing a throughway parallel with the axis of rotation of the carrier, pusher elements, one for each pair of chambers, supported by the carrier for movement therewith and lengthwise of the axis of the throughways afforded by the super-imposed chambers appropriate thereto, a delivery conveyor movable in a path tangential to that of the carrier and operable to deliver cartons one at a time on to the pusher elements while said pusher elements are located below the pairs of chambers with which they are associated, means to effect heating of the heating chambers and cooling of the cooling chambers, and cam means co-operating with the pusher elements and operable during each revolution of the carrier to cause each pusher element to move a carton into the heating chamber associated therewith and to effect engagement of the side and front lid flaps of the carton with the sides and front of the carton body, to move a carton already in the heating chamber into the cooling chamber superimposed thereon, and to eject from the cooling chamber a carton already located therein.

13. A machine according to claim 12, including folder means co-operating with said delivery conveyor and operable to fold the lid of a carton to overlie the body thereof preparatory to the movement of the carton by a pusher element into a heating chamber.

14. A machine according to claim 12, including for each heating chamber a locating device movable therewith and operable to engage a carton delivered by said delivery conveyor and to locate the carton on the pusher element associated with the heating chamber in preparation for movement of the carton into the heating chamber by the pusher element.

15. A machine according to claim 14, wherein the locating means comprises a stop movable with the heating chamber, a locating finger movable with and relative to the heating chamber, and finger-actuating means operable to control movement of said locating finger towards and away from the stop and to urge a carton into engagement with the stop.

16. A machine according to claim 15, in which the locating finger is pivotally mounted on the rotatable carrier and the finger-actuating means comprises a bell-crank lever pivotally mounted on the carrier, a connecting rod connecting the locating finger and said lever, a spring urging the finger away from said stop, and a stationary cam arranged for cooperation with the lever to effect movement thereof about its pivotal axis to move the finger towards the stop.

17. A machine according to claim 12, in which the heater means includes electrical heater elements embodied in the walls of each of the heating chambers, and electrical brushes connected with the heater elements for rotation with the carrier and cooperating with slip rings arranged for connection to a source of electrical potential.

18. A machine according to claim 17, in which the cooling means includes series connected conduits formed in the walls of the cooling chambers, and pipe connections with said conduits to permit the flow of cooling fluid through the conduits.

19. A machine according to claim 18, in which said pipe connections comprise an inflow coupling and an outflow coupling connected with the conduit of one cooling chamber, and including a stationary pillar about which the carrier is rotatable, and concentric inflow and outflow pipes extending through said pillar and connected respectively with said inflow and outflow couplings.

No references cited.